United States Patent
Tweedt (10) Patent No.: US 10,358,926 B2
(45) Date of Patent: Jul. 23, 2019

(54) LOW-NOISE AIRFOIL FOR AN OPEN ROTOR

(71) Applicant: General Electric Company, Schenectady, NY (US)

(72) Inventor: Daniel Lawrence Tweedt, West Chester, OH (US)

(73) Assignee: General Electric Company, Schenectady, NY (US)

( * ) Notice: Subject to any disclaimer, the term of this patent is extended or adjusted under 35 U.S.C. 154(b) by 124 days.

(21) Appl. No.: 15/675,239

(22) Filed: Aug. 11, 2017

(65) Prior Publication Data

US 2019/0048724 A1    Feb. 14, 2019

(51) Int. Cl.
*F01D 5/14* (2006.01)
*B64C 11/18* (2006.01)
(Continued)

(52) U.S. Cl.
CPC .............. *F01D 5/141* (2013.01); *B64C 11/18* (2013.01); *B64C 21/00* (2013.01); *F01D 5/142* (2013.01); *F01D 5/16* (2013.01); *F05D 2220/36* (2013.01); *F05D 2240/301* (2013.01); *F05D 2240/302* (2013.01); *F05D 2240/303* (2013.01); *F05D 2240/304* (2013.01); *F05D 2240/305* (2013.01); *F05D 2240/306* (2013.01); *F05D 2250/70* (2013.01); *F05D 2260/96* (2013.01)

(58) Field of Classification Search
CPC ......... B64C 11/18; F01D 5/141; F01D 5/142; F05D 2220/26; F05D 2240/301–2240/306; F05D 2260/96; F05D 2260/961
See application file for complete search history.

(56) References Cited

U.S. PATENT DOCUMENTS 3,565,548 A    2/1971  Fowler et al.
4,459,083 A *  7/1984  Bingham ................ B64C 11/18
                                          244/35 R
(Continued)

FOREIGN PATENT DOCUMENTS

EP    0 306 434 A2    3/1989
EP    0 385 913 A1    9/1990
(Continued)

OTHER PUBLICATIONS

Extended European Search Report and Opinion issued in connection with corresponding EP Application No. 18188455.2 dated Jan. 3, 2019.

*Primary Examiner* — Erick R Solis
(74) *Attorney, Agent, or Firm* — General Electric Company; Pamela Kachur (57) ABSTRACT

An airfoil section of a blade for an open rotor includes: a pressure side and a suction side, the pressure side and the suction side intersecting at a leading edge and a trailing edge, wherein a chord of the airfoil section is defined as a straight-line distance between the leading edge and the trailing edge; the airfoil section has a meanline defined midway between the pressure side and the suction side; and the meanline is shaped such that, in the presence of predetermined transonic or supersonic relative velocity conditions, maximum and minimum ideal Mach numbers on the suction side will lie within a 0.08 band, between 25% and 80% percent of the chord.

26 Claims, 7 Drawing Sheets

(51) Int. Cl.
*B64C 21/00* (2006.01)
*F01D 5/16* (2006.01)

(56) References Cited

U.S. PATENT DOCUMENTS

| | | | |
|---|---|---|---|
| 4,652,213 | A | 3/1987 | Thibert et al. |
| 4,730,985 | A | 3/1988 | Rothman et al. |
| 4,830,574 | A | 5/1989 | Wainauski et al. |
| 4,834,617 | A | 5/1989 | Inainauski et al. |
| 5,217,349 | A | 6/1993 | Succi |
| 5,433,586 | A | 7/1995 | Cole |
| 5,911,559 | A * | 6/1999 | Menthe ............... B63H 1/26 416/223 R |
| 6,457,671 | B1 | 10/2002 | Sherman |
| 6,899,525 | B2 * | 5/2005 | Vanmoor ............ B63H 1/26 416/223 R |
| 9,340,277 | B2 | 5/2016 | Breeze-Stringfellow |
| 2008/0118362 | A1 * | 5/2008 | Hu ...................... F01D 5/141 416/223 A |
| 2011/0056183 | A1 * | 3/2011 | Sankrithi ............. B64C 11/48 60/204 |
| 2013/0156583 | A1 * | 6/2013 | Wood ................. B64C 11/18 416/198 A |
| 2015/0040538 | A1 * | 2/2015 | Karam ................. F02C 7/24 60/273 |
| 2016/0159459 | A1 * | 6/2016 | Louet .................. F01D 5/141 416/124 |
| 2017/0088260 | A1 | 3/2017 | Hopping et al. |
| 2017/0274980 | A1 * | 9/2017 | Dejeu ................. B64C 11/06 |
| 2017/0284205 | A1 * | 10/2017 | Dejeu ................. B64C 11/06 |

FOREIGN PATENT DOCUMENTS

| | | |
|---|---|---|
| EP | 2 634 087 A2 | 9/2013 |
| WO | 99/14112 A1 | 3/1999 |

\* cited by examiner

LOW-NOISE AIRFOIL FOR AN OPEN ROTOR

BACKGROUND OF THE INVENTION

The present invention relates generally to aircraft propulsion, and more specifically to aircraft engines incorporating an open rotor for propulsion.

It is well-known to provide aircraft propulsion using open rotors, defined generally as an apparatus including a rotatable hub carrying an array of airfoils which are configured to produce thrust, and which are not surrounded by an outer shroud.

One type of open rotor is a conventional propeller. These are mainly used for low-speed applications and generally become inefficient at high subsonic speeds.

There is an interest in using open rotors to propel higher-speed vehicles using blades optimized therefor; these types of open rotor are often referred to as "prop fans" or "unducted fans". In high-speed subsonic flight, the combination of rotor rotational speed, blade radius, and flight speed results in blade relative speeds that are supersonic through surrounding air, particularly at the outer span.

One problem with such open rotors is that blade-generated shock waves will propagate outward from the rotor and impact the aircraft fuselage, producing vibration and cabin noise. Since blade-generated cabin noise is an obstacle to future acceptance of the open rotor engine architecture for commercial aircraft propulsion systems, it is desirable that it be minimized.

BRIEF DESCRIPTION OF THE INVENTION

This problem is addressed by an open rotor blade for high speed subsonic flight having near-uniform chordwise pressure distributions on the blade suction side over the outer portion of the span.

According to one aspect of the technology described herein, an airfoil section of a blade for an open rotor includes: a pressure side and a suction side, the pressure side and the suction side intersecting at a leading edge and a trailing edge, wherein a chord of the airfoil section is defined as a straight-line distance between the leading edge and the trailing edge; the airfoil section has a meanline defined midway between the pressure side and the suction side; and the meanline is shaped such that, in the presence of predetermined transonic or supersonic relative velocity conditions, maximum and minimum ideal Mach numbers on the suction side will lie within a 0.08 band, between 25% and 80% percent of the chord.

According to another aspect of the technology described herein, an airfoil section of a blade for an open rotor includes: a pressure side and a suction side, the pressure side and the suction side intersecting at a leading edge and a trailing edge, wherein a chord of the airfoil section is defined as a straight-line distance between the leading edge and the trailing edge; the airfoil section has a meanline defined midway between the pressure side and the suction side; the meanline is shaped such that it includes a predetermined total turning; the meanline is shaped such that less than 15% of the total turning occurs from 40% to 75% of the chord; and the meanline is shaped such that greater than 35% of the total turning occurs in the aft 25% of the chord.

According to another aspect of the technology described herein, an open rotor apparatus includes: a first airfoil row including a first disk rotatable about an axial centerline and carrying an annular array of airfoil-shaped blades, wherein each of the blades has spaced-apart pressure and suction sides extending radially in span from a root to a tip, and extending axially in chord between spaced-apart leading and trailing edges, wherein each of the blades of the first airfoil row includes at least one airfoil section in which: a meanline of the airfoil section is shaped such that it includes a predetermined total turning; and the meanline is shaped such that greater than 35% of the total turning occurs in the aft 25% of the chord; the meanline is shaped such that less than 15% of the total turning occurs from 40% to 75% of the chord; and a second airfoil row disposed downstream of the first airfoil row.

BRIEF DESCRIPTION OF THE DRAWINGS

The invention may be best understood by reference to the following description taken in conjunction with the accompanying drawing figures in which.

DETAILED DESCRIPTION OF THE INVENTION

Figures 1, 2:
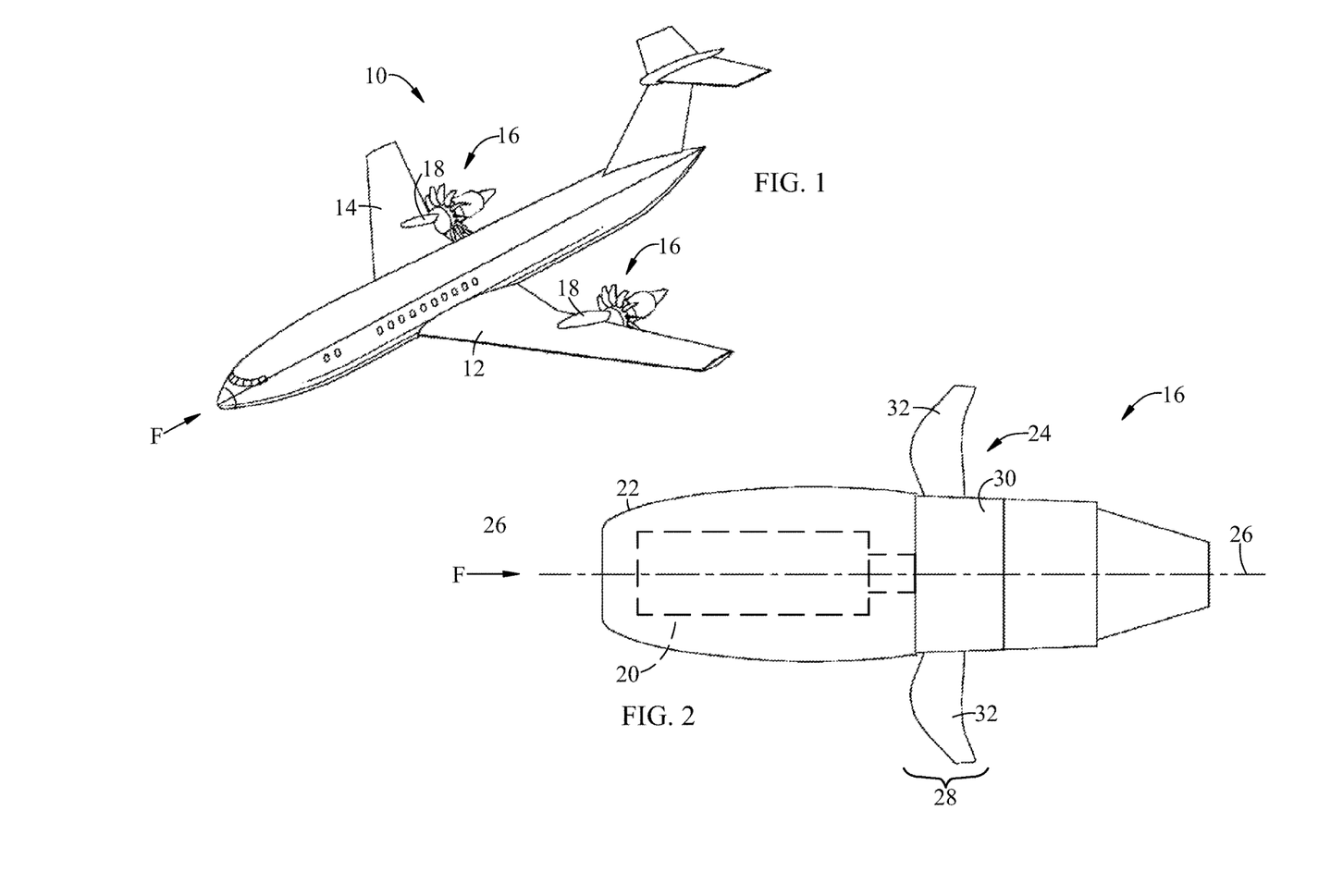
FIG. 1 is an illustration of an aircraft including an exemplary open rotor.
FIG. 2 is a side view of the exemplary open rotor shown in FIG. 1.

Referring to the drawings wherein identical reference numerals denote the same elements throughout the various views, FIG. 1 illustrates schematically an exemplary aircraft 10 including a pair of wings 12 and 14. Each wing 12 and 14 supports a propulsion device 16 via a pylon 18. Alternatively, one or more propulsion devices 16 may be mounted to any suitable location on aircraft 10.

Referring to FIG. 2, one of the propulsion devices 16 is shown in more detail. The propulsion device 16 includes a prime mover 20 (shown schematically) enclosed in a nacelle 22 and coupled in driving relationship with an open rotor 24 that is mounted for rotation about a centerline axis 26.

It is noted that, as used herein, the terms "axial" and "longitudinal" both refer to a direction parallel to the centerline axis 26, while "radial" refers to a direction perpendicular to the axial direction, and "tangential" or "circumferential" refers to a direction mutually perpendicular to the axial and radial directions. As used herein, the terms "forward" or "front" refer to a location relatively upstream in an air flow passing through or around a component, and the terms "aft" or "rear" refer to a location relatively downstream in an air flow passing through or around a component. The direction of this flow is shown by the arrows "F"

in FIGS. 1 and 2. These directional terms are used merely for convenience in description and do not require a particular orientation of the structures described thereby.

The prime mover 20 may be any device operable to rotate the open rotor 24 at the required speed under expected mechanical and aerodynamic loads. Nonlimiting examples of prime movers include heat engines, motors (e.g. electric, hydraulic, or pneumatic), or combinations thereof (for example electric hybrid drivetrains). In one example, the prime mover 20 may be a gas turbine engine having a core including a compressor, a combustor and one or more turbines. The open rotor 24 may be driven directly by the prime mover 20, or through an intermediate geartrain.

In the illustrated example, the open rotor 24 is a single-stage open rotor including a single airfoil row 28 comprising a rotatable disk or hub 30 having an annular array of rotor blades 32 extending therefrom.

Figure 3:
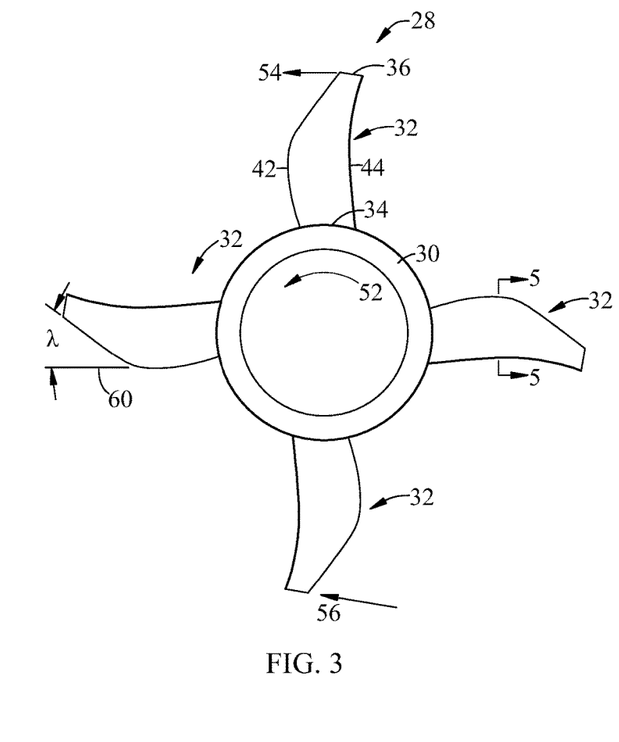
FIG. 3 is a schematic front elevation view of the open rotor shown in FIG. 1.
Figure 4:
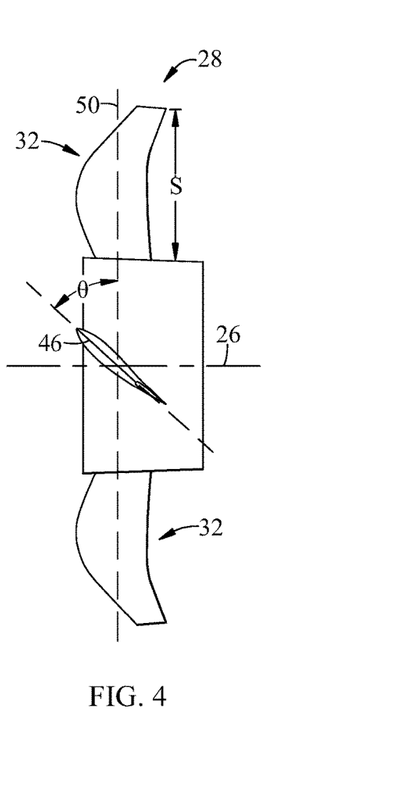
FIG. 4 is a schematic side elevation view of the open rotor shown in FIG. 1.
Figure 5:
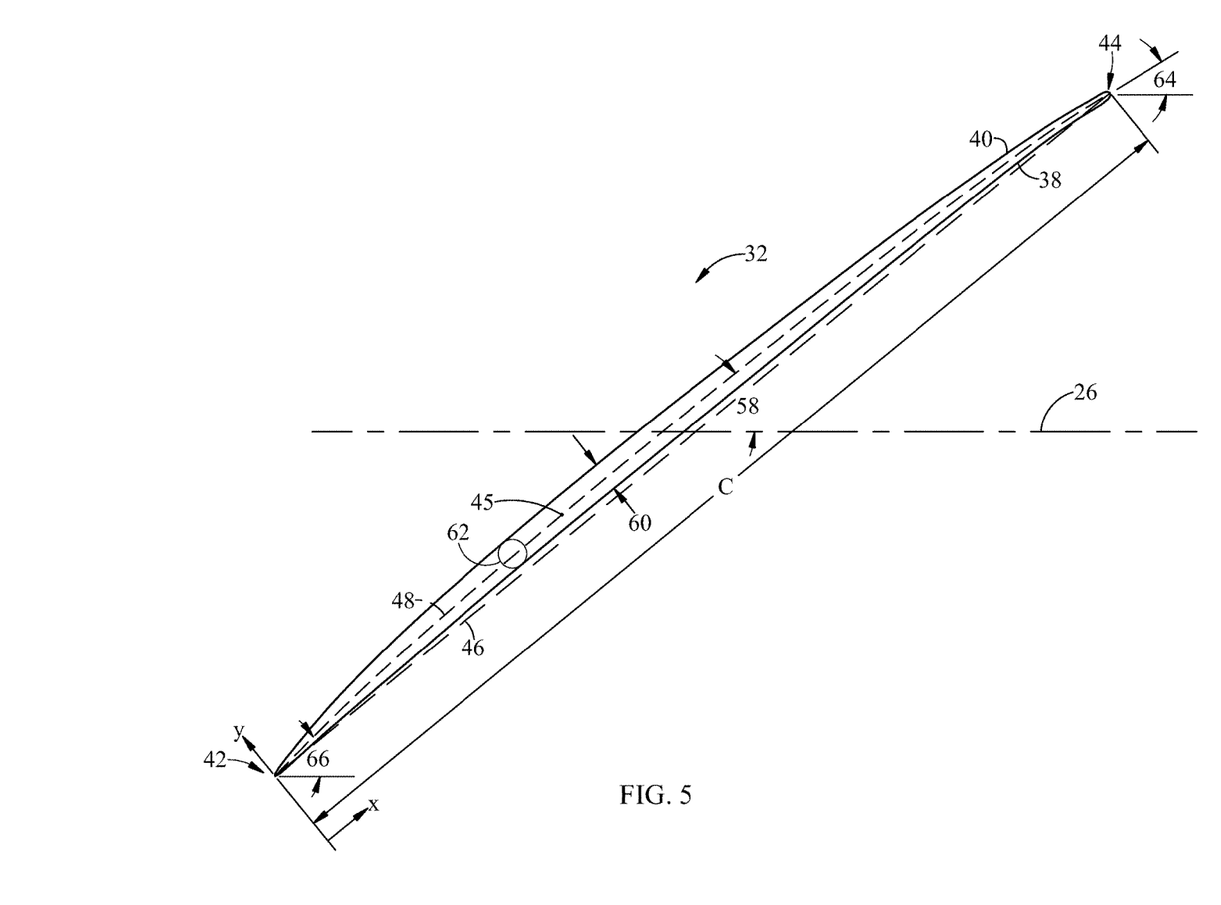
FIG. 5 is a schematic sectional view taken along lines 5-5 of FIG. 3.

Referring to FIGS. 3-5, each blade 32 extends from a root 34 at the hub 30 to a tip 36, and includes a generally concave pressure side 38 joined to a generally convex suction side 40 at a leading edge 42 and a trailing edge 44. The blade 32 may be represented as an array or "stack" of individual airfoil sections arrayed along a spanwise stacking line 45. FIG. 5 illustrates one such airfoil section. For each individual airfoil section of the blade 32, an imaginary straight line referred to as a "chord line" 46 connects the leading edge 42 and the trailing edge 44. Also for each individual airfoil section of the blade 32, a curve called the "mean camber line" or "meanline" 48 represents the locus of points lying halfway between the pressure and suction sides 38, 40. Typically, the blade 32 would incorporate "twist", a feature in which the stacked airfoil sections are rotated relative to each other about the spanwise stacking line 45. Although not shown in the illustrated example, it will be understood that the blade 32 may incorporate "lean", a feature in which the stacked airfoil sections are laterally shifted relative to each other, and/or "sweep", a feature in which the stacked airfoil sections are shifted in the chordwise direction.

The blades 32 may be made from suitable high strength materials such as metal alloys (e.g. iron, nickel, or titanium alloys) or composite materials, such as carbon reinforcing fibers in an epoxy matrix, with or without metallic shielding.

In operation, the hub 30 rotates about the centerline axis 26, and the blades 32 sweep through a blade plane 50 which is perpendicular to the centerline axis 26. Airfoil sections of the blades 32 are each disposed at pitch angle θ, dependent on radius (the blades 32 may incorporate twist) and measured between the blade's chord line 46 and the blade plane 50. A relatively small pitch angle θ is typically referred to as a "flat" or "fine" or "low" pitch, and a relatively large pitch angle θ is typically referred to as a "steep" or "coarse" or "high" pitch. It will be understood that in general, the appropriate pitch angle θ for efficient propulsion increases with increasing aircraft speed.

The blades 32 may have a "fixed pitch" configuration in which the airfoil section pitch angles θ of the blades 32 cannot be changed. Alternatively, the blades 32 may have a "variable pitch" configuration in which the airfoil section pitch angles θ of the blades 32 may be uniformly varied (i.e. same pitch angle change for all airfoil sections) in flight. A variable-pitch open rotor may be used to provide thrust efficiently at both high and low speeds. One or more conventional pitch change actuators (not shown) may be used to effect pitch changes.

Each blade 32 has a span (or span dimension) "S" defined as the radial distance from the root 34 to the tip 36, and a chord (or chord dimension) "C" defined as the length of the chord line 46. The chord dimension may be constant over the span S, or it may vary over the span S, as shown.

In operation, the blades 32 rotate at various shaft speeds or rotor speeds (expressed as RPM or as an angular velocity), depending upon the phase of flight. The tangential velocity of any given point on the blade 32, that is, its linear speed in a tangential direction, may be computed as the radius of that point from the centerline axis 26 multiplied by the angular velocity, shown at arrow 52.

It will be understood that, for any given rotor speed, the tangential velocity of the blade 32 increases as radius increases, and that the maximum tangential velocity for any rotor speed occurs at the tip 36. The tangential velocity at the tip 36 is generally referred to as the "tip speed", shown at arrow 54.

In flight, the blade 32 experiences a "blade-relative velocity" or "relative Mach number", shown at arrow 56. It will be understood that the blade-relative velocity is a three-dimensional vector quantity with axial, radial, and tangential components. Assuming the radial velocity to be zero, and ignoring secondary factors, the blade-relative velocity at the tip is the vector sum of the tip speed and the flight speed. The blade-relative velocity is approximately equivalent to the speed of the relative wind parallel to the chord line 46 of the blade 32.

Under some operating conditions, for example in the airspeed and tip speed conditions described above, all or portions of the blades 32, for example the outer ½ to ⅓ of the blade span, will experience blade-relative velocities that exceed the local speed of sound. For flow around the blades with substantial regions of both subsonic (Mach numbers less than 1.0) and supersonic (Mach numbers greater than 1.0) blade-relative velocities, the flow field and blade operating regime is called transonic, and for mostly supersonic flow around the blades, the flow field and blade operating regime is called supersonic.

Referring to FIG. 5, an airfoil section of the blade 32 has a meanline angle 58, which refers to the angle between the tangent to the meanline 48 and centerline axis 26. The meanline angle 58 can be measured at any location along the meanline 48. The value of the meanline angle 58 is a function of both the curvature of the meanline 48 and the pitch angle θ of the blade 32. Thus, the absolute value of the meanline angle 58 will change as the pitch angle θ of the blade 32 changes. However, it will be understood that the overall meanline shape characteristic is unchanging and depends solely on the curvature of the blade 32.

The blade 32 has a thickness 60 which is a distance measured normal to the meanline 48 between the pressure side 38 and suction side 40, which can be measured at any location along the meanline 48. In accordance with conventional practice, a thickness ratio is computed as the absolute value of the thickness divided by the chord length, expressed as a percentage.

A location along the meanline 48 of either the meanline angle 58 or the thickness 60 may be described using a chord fraction, the value of which may be expressed as a percentage. As used herein, chord fraction refers to a chordwise distance of the location from leading edge 42 to a point of interest divided by the chord C. So, for example, the leading edge 42 is located at 0% of the chord, and the trailing edge 44 is located at 100% of the chord.

A maximum thickness of the airfoil section of the blade 32 is represented by the diameter of an inscribed circle 62 between the pressure side 38 and the suction side 40. In one embodiment, the maximum thickness is located at approximately 20% to 30% chord fraction. In one example, the airfoil maximum thickness may be about 2% to about 4% of the chord C.

As used herein, camber is defined as a change in meanline angle 58 between any two points along meanline 48. Curvature of the meanline 48 is calculated as the derivative, or rate of change, of meanline angle 58 with respect to arc length along meanline 48.

Figure 6:
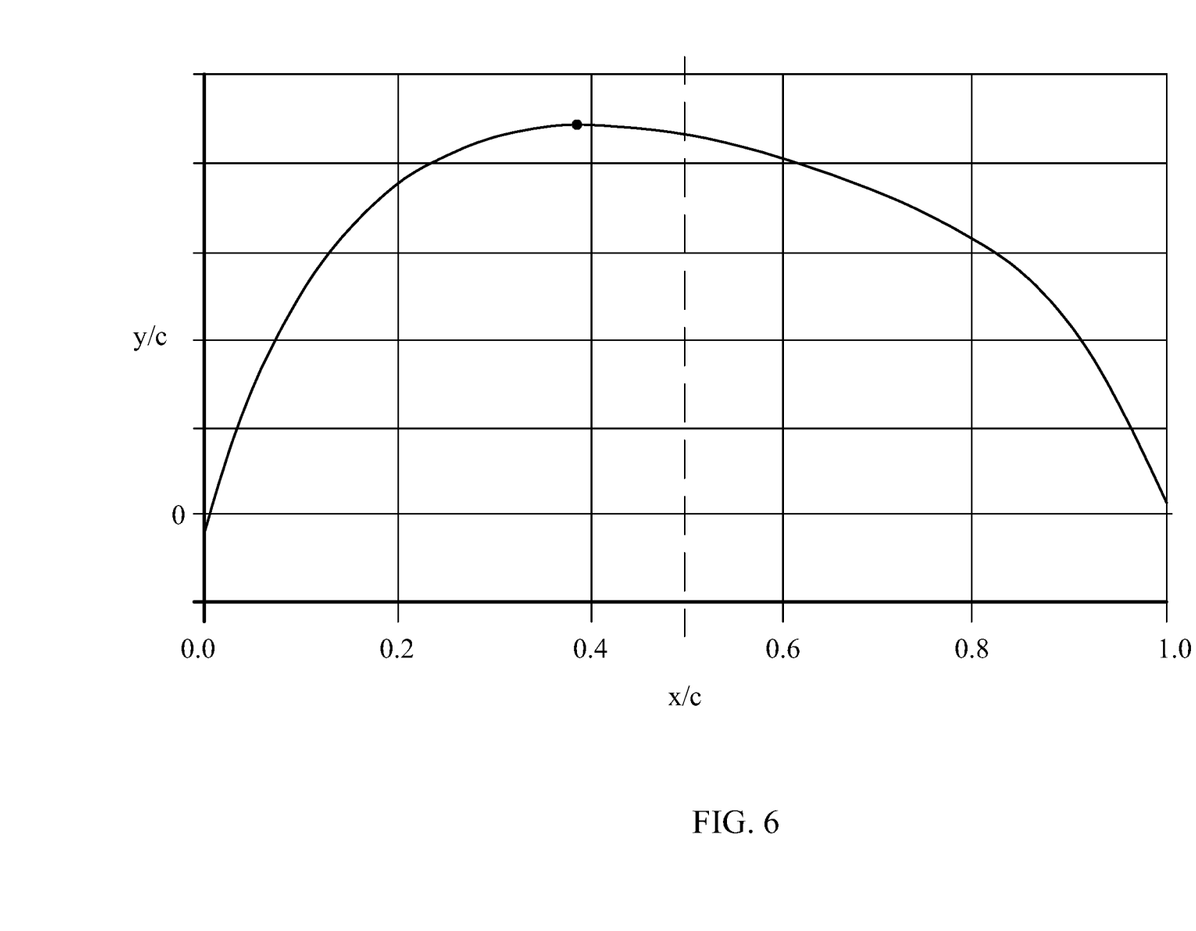
FIG. 6 is a plot of a meanline shape of the exemplary airfoil section shown in FIG. 5.

FIG. 6 plots the shape of the meanline 48 of the exemplary airfoil section. In FIG. 6, the vertical axis represents the distance from the chord line 46 to the meanline 48, measured perpendicular to the chord line 46, expressed as a fraction of chord. This value may be referred to as the "camber rise", which is zero at the leading and trailing edges. It is noted that the scale of the vertical axis in FIG. 6 is different from the scale of the horizontal axis.

In the illustrated example, the location of the maximum value of the camber rise is located within the forward half of the airfoil section, that is, forward of the 50% chord location (indicated by a vertical dashed line).

The meanline angle at the trailing edge 44 is referred to as the "blade exit angle" 64 (see FIG. 5). This may or may not be equal to the angle between the airflow and the centerline axis 26 directions at the trailing edge 44. The meanline angle at the leading edge 42 is referred to as the "blade inlet angle" 66. This may or may not be equal to the angle between the airflow and the centerline axis 26 directions at the leading edge 42.

A parameter called "total turning" is defined as the absolute value of the difference between the blade exit angle 64 and the blade inlet angle 66.

Figure 7:
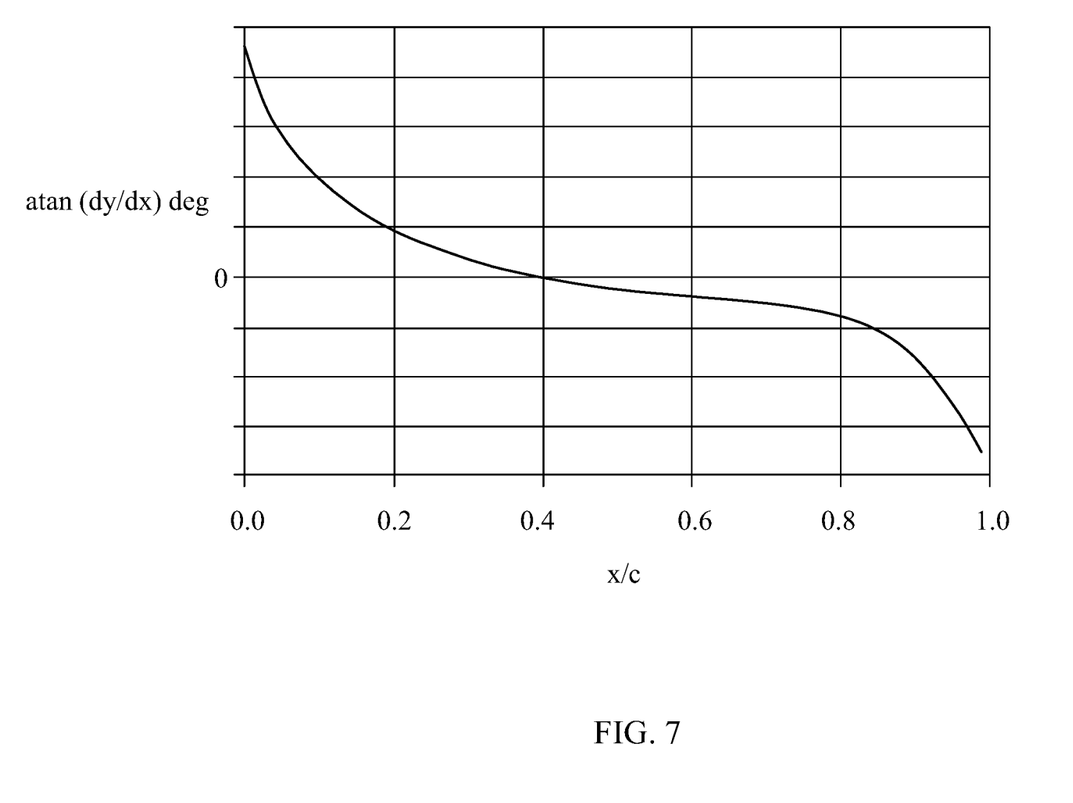
FIG. 7 is a plot of meanline angle as a function of a fraction of chord length of the exemplary airfoil section shown in FIG. 5.

It will be understood that for any given value of the total turning, the meanline 48 can be shaped to contribute different amounts to that total turning at different chordwise locations. FIG. 7 plots the angle distribution of the meanline 48 of the exemplary airfoil section. In FIG. 7, the vertical axis represents the meanline angle 58 minus the compliment of the pitch angle θ for the section.

For purposes of noise reduction, it is desirable to incorporate a relatively large amount of the total turning of the airfoil section in an aft portion thereof. For example, greater than 35% of the total turning may occur in the aft 25% of the chord.

In one example, the airfoil section may incorporate about one-half of the total turning in a forward portion of the airfoil section, very low turning in a mid-to-aft portion of the airfoil section, and a relatively large amount of turning in the aft portion of the airfoil.

In one example, less than 15% of the total turning may occur from 40% to 75% of the chord, and greater than 35% of the total turning may occur in the aft 25% of the chord. In another example, less than 13% of the total turning may occur from 40% to 75% of the chord, and greater than 35% of the total turning may occur in the aft 25% of the chord. In either example, the total turning may be greater than 10°.

The open rotor 24 described above may be used by powering the open rotor 24 with the prime mover 12 to propel the aircraft 10 in atmospheric flight, such that a relative velocity at the leading edge 42 within an outer portion thereof is transonic or supersonic. For example, these conditions may occur at a flight speed between about Mach 0.7 to about Mach 0.8. For example, the open rotor 24 may be operated at a tip speed greater than about 152 m/s (500 ft/s) and a flight Mach number greater than about 0.72.

In general, the term "propelling the aircraft" as used herein refers to an approximately steady-state, sustainable condition achievable by operation of the prime mover 12, for example takeoff, climb, descent, and/or cruise flight, and not to conditions characterized or dominated by transient effects, e.g. achieved in a rapid descent or dive.

Figure 8:
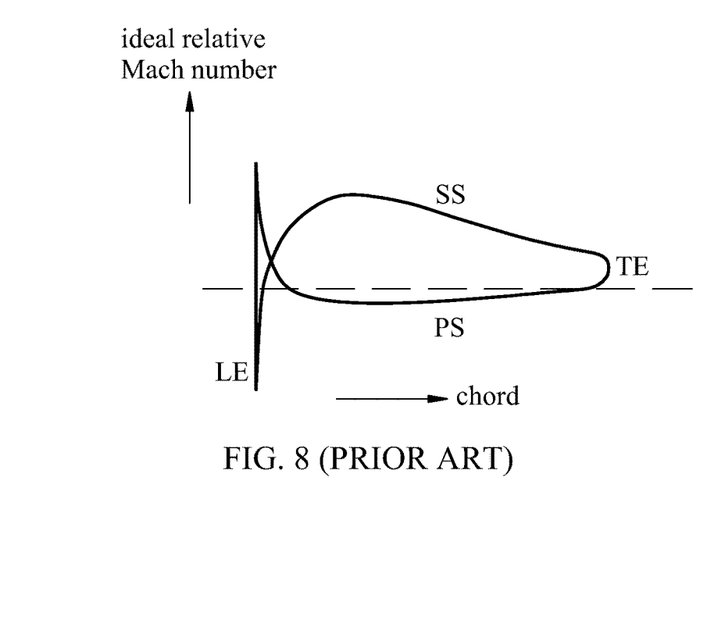
FIG. 8 is a plot of aerodynamic loading versus chord for a representative prior art airfoil section.

The combination of meanline shaping features described above may be applied so as to increase the uniformity of aerodynamic loading on the airfoil section in a chordwise direction, as compared to prior art designs. FIG. 8 is a plot illustrating the aerodynamic loading on a prior art open rotor airfoil section at its aerodynamic design point (ADP). It can be seen that the aerodynamic loading is non-uniform in the chordwise direction with the peak suction side (SS) Mach number occurring in a front half of the chord.

Figure 9:
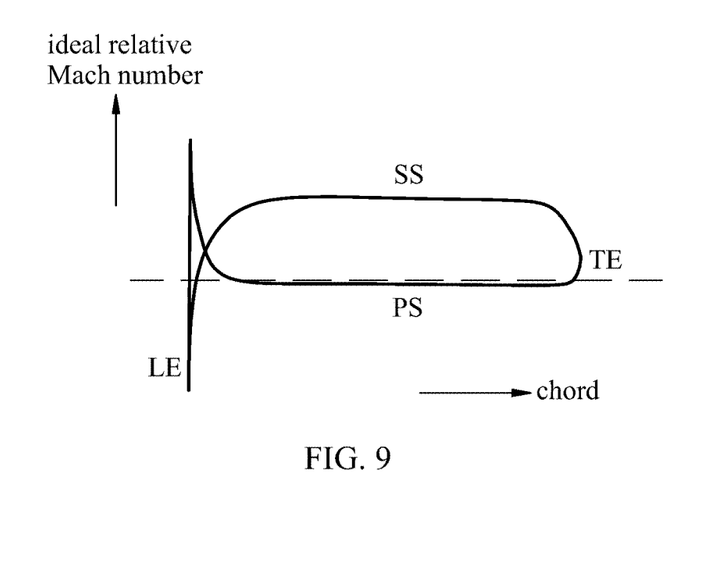
FIG. 9 is a plot of aerodynamic loading versus chord for an airfoil section configured according to an aspect of the present invention.

In contrast, FIG. 9 is a plot illustrating the aerodynamic loading on an airfoil section at its ADP designed in accordance to the principles described herein (such as the airfoil section seen in FIG. 5). It can be seen that the suction side (SS) Mach number is near-uniform (i.e. a flat horizontal line) over most if not virtually all of the chord. More specifically, in one example, the meanline shaping can be such that, at a predetermined transonic or supersonic relative velocity condition, blade suction side maximum and minimum ideal (isentropic) Mach numbers lie within a 0.08 band between 25% and 80% percent of the chord. (Stated another way, the maximum ideal Mach number is not more than 0.08 greater than the minimum Mach number). This uniformity of static pressure (ideal Mach number is a proxy for static pressure) can be expected in individual airfoil sections, typically in the outer ⅓ of the span. Considering sections further inboard (lower radii), the 0.08 Mach number band could extend over a smaller part of the chord, for example from 25% to 75% percent of the chord, or from 25% to 70% percent of the chord.

This near-uniform ADP chordwise pressure distribution has numerous benefits. Primarily, it will reduce cumulative supersonic compression and move the terminal shock to the trailing edge 44. Deliberate placement of the terminal shock at the trailing edge is more predictable and less sensitive to minor aerodynamic changes, as compared to an upstream location, and reduces the strength of blade generated shocks away from the blades and beyond the blade tip radius. The weaker far-field shocks will cause less noise when they strike the aircraft cabin.

Near-uniform pressure on the suction side delays flow deceleration, which increases aerodynamic efficiency by delaying laminar-to-turbulent boundary layer transition to a region further aft on the airfoil.

Finally, it has the potential to reduce blade far-field shock strength at lower rotational speeds.

Figures 10, 11:
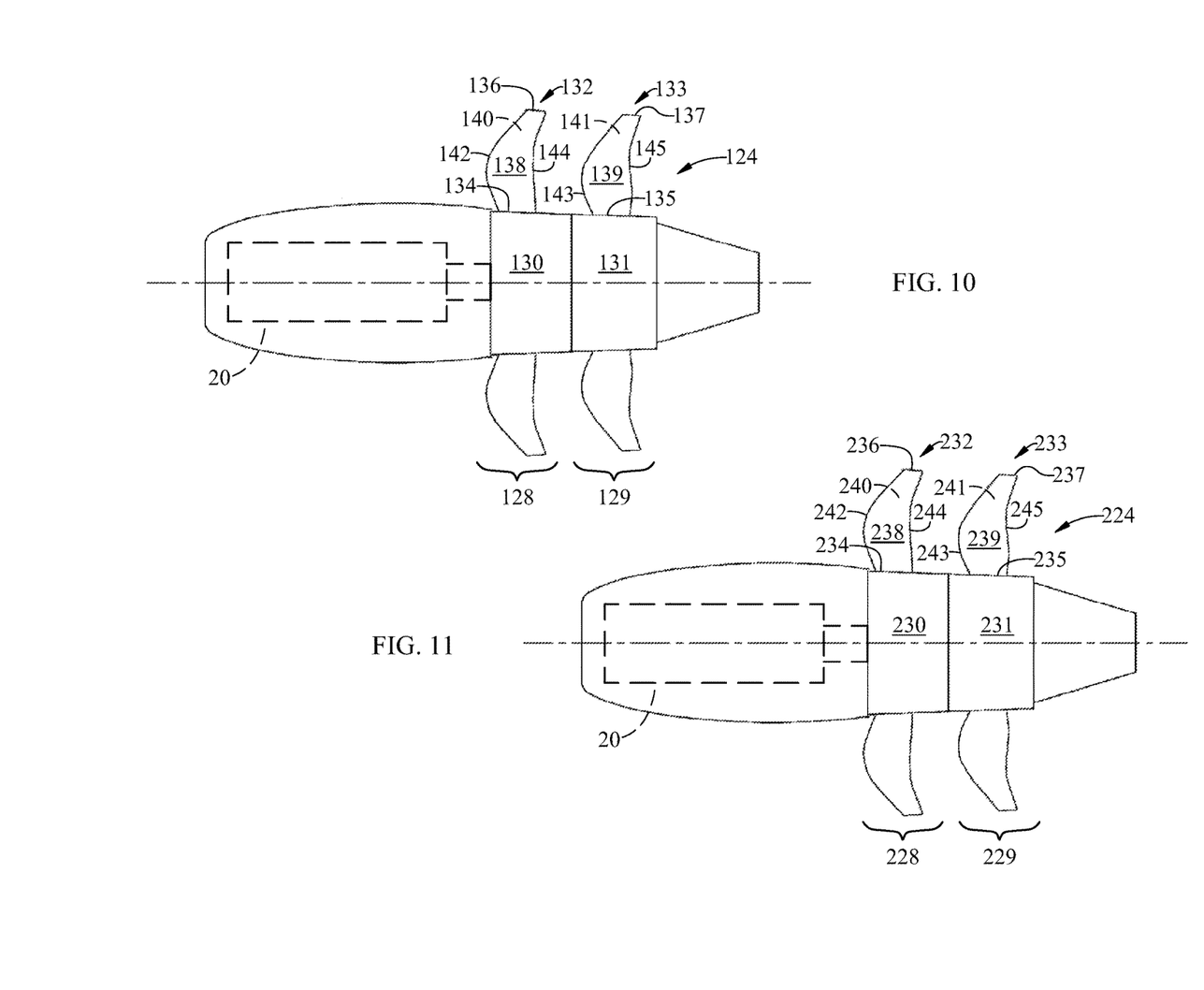
FIG. 10 is a side view of an alternative open rotor.
FIG. 11 is a side view of another alternative open rotor.

The airfoil design principles described above may be applied to other configurations of open rotors. For example, FIG. 10 illustrates an alternative open rotor 124 which is drivingly coupled to a prime mover 20. In the illustrated example, the open rotor 124 includes a first or forward airfoil row 128, and a second or aft airfoil row 129.

The prime mover 20 may be configured to rotate the forward and aft airfoil rows in opposite directions (counter-rotating).

The forward airfoil row 128 comprises a hub or disk 130 having a plurality of blades 132 extending therefrom. Each blade 132 extends from a root 134 at the hub 130 to a tip 136, and includes a generally concave pressure side 138 joined to a generally convex suction side 140 at a leading edge 142 and a trailing edge 144. Each blade 132 has a span and a chord, as defined above, and the blades 132 can be uniformly or non-uniformly spaced around the hub 130.

The characteristics of the blades 132 (i.e. airfoil section shaping) may be the same as or similar to those of the blades 32 described above.

The aft airfoil row 129 comprises a hub or disk 131 having a plurality of blades 133 extending therefrom. Each blade 133 extends from a root 135 at the hub 131 to a tip 137 and includes a generally concave pressure side 139 joined to a generally convex suction side 141 at a leading edge 143 and a trailing edge 145. Each blade 132 has a span and a chord, as defined above, and the blades 133 can be uniformly or non-uniformly spaced around the hub 131.

The characteristics of the blades 133 (i.e. airfoil section shaping) may be the same as or similar to those of the blades 32 described above.

FIG. 11 illustrates an alternative open rotor 224 which is drivingly coupled to a prime mover 20. In the illustrated example, the open rotor 224 includes a first or forward airfoil row 228, and a second or aft airfoil row 229. In this embodiment, the first airfoil row 228 rotates while the second airfoil row 229 is stationary.

The forward airfoil row 228 comprises a hub or disk 230 having a plurality of blades 232 extending therefrom. Each blade 232 extends from a root 234 at the hub 230 to a tip 236 and includes a concave pressure side 238 joined to a convex suction side 240 at a leading edge 242 and a trailing edge 244. Each blade 232 has a span and a chord, as defined above, and the blades 232 can be uniformly or non-uniformly spaced around the hub 230.

The characteristics of the blades 232 (i.e. airfoil section shaping) may be the same as those of the blades 32 described above.

The aft airfoil row 229 comprises a stationary hub 231 having a plurality of outlet guide vanes 233 extending therefrom. Each outlet guide vane 233 extends from a root 235 at the hub 231 to a tip 237 and includes a concave pressure side 239 joined to a convex suction side 241 at a leading edge 243 and a trailing edge 245. Each outlet guide vane 233 has a span and a chord, as defined above, and the outlet guide vanes 233 can differ from one another and can be uniformly or non-uniformly spaced around the hub 231.

The foregoing has described an airfoil for an open rotor and an open rotor apparatus. All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

What is claimed is:

1. An airfoil section of a blade for an open rotor, comprising: a pressure side and a suction side, the pressure side and the suction side intersecting at a leading edge and a trailing edge, wherein a chord of the airfoil section is defined as a straight-line distance between the leading edge and the trailing edge;
   the airfoil section has a meanline defined midway between the pressure side and the suction side; and
   the meanline is shaped such that, in the presence of predetermined transonic or supersonic relative velocity conditions, maximum and minimum ideal Mach numbers on the suction side will lie within a 0.08 band, between 25% and 80% percent of the chord.

2. The airfoil section according to claim 1, wherein a maximum camber rise of the meanline is located forward of 50% of the chord.

3. The airfoil section according to claim 1, wherein a thickness of the airfoil section is defined as a distance measured normal to the meanline between the pressure side and the suction side, and wherein a maximum value of the thickness occurs at a location between about 20% to about 30% of the chord.

4. The airfoil section according to claim 1, wherein the airfoil section has a maximum thickness of about 2% to about 4% of the chord.

5. The airfoil section according to claim 1, wherein the airfoil section is configured to operate at a flight speed between about Mach 0.7 and about Mach 0.8.

6. An airfoil section of a blade for an open rotor, comprising: a pressure side and a suction side, the pressure side and the suction side intersecting at a leading edge and a trailing edge, wherein a chord of the airfoil section is defined as a straight-line distance between the leading edge and the trailing edge;
   the airfoil section has a meanline defined midway between the pressure side and the suction side;
   the meanline is shaped such that it includes a predetermined total turning;
   the meanline is shaped such that less than 15% of the total turning occurs from 40% to 75% of the chord; and
   the meanline is shaped such that greater than 35% of the total turning occurs in the aft 25% of the chord.

7. The airfoil of claim 6 wherein the total turning is greater than 10°.

8. The airfoil section of claim 6 wherein the meanline is shaped such that less than 13% of the total turning occurs from 40% to 75% of the chord.

9. The airfoil section of claim 6 wherein:
   an inlet angle is defined as an angle between a tangent to the meanline and a centerline of the open rotor at the leading edge;
   an exit angle is defined as an angle between a tangent to the meanline and a centerline of the open rotor at the trailing edge; and
   the total turning is defined as an absolute value of the difference between the inlet angle and the exit angle.

10. The airfoil section according to claim 6, wherein a maximum camber rise of the meanline is located forward of 50% of the chord.

11. The airfoil section according to claim 6, wherein a thickness of the airfoil section is defined as a distance measured normal to the meanline between the pressure side and the suction side, and wherein a maximum value of the thickness occurs at a location between about 20% to about 30% of the chord.

12. The airfoil section according to claim 6, wherein the airfoil section has a maximum thickness of about 2% to about 4% of the chord.

13. The airfoil section according to claim 6, wherein the airfoil section is configured to operate at a flight speed between about Mach 0.7 and about Mach 0.8.

14. A blade for an open rotor, comprising: an airfoil body having spaced-apart pressure and suction sides extending radially in span from a root to a tip, and extending axially in chord between spaced-apart leading and trailing edges, the airfoil body comprising at least one airfoil section according to claim 6.

15. The apparatus of claim 14 further comprising a disk rotatable about an axial centerline and carrying a first airfoil row of the blades.

16. An open rotor apparatus, comprising:
a first airfoil row including a first disk rotatable about an axial centerline and carrying an annular array of airfoil-shaped blades, wherein each of the blades has spaced-apart pressure and suction sides extending radially in span from a root to a tip, and extending axially in chord between spaced-apart leading and trailing edges, wherein each of the blades of the first airfoil row includes at least one airfoil section in which:
a meanline of the airfoil section is shaped such that it includes a predetermined total turning; and
the meanline is shaped such that greater than 35% of the total turning occurs in the aft 25% of the chord;
the meanline is shaped such that less than 15% of the total turning occurs from 40% to 75% of the chord; and
a second airfoil row disposed downstream of the first airfoil row.

17. The apparatus of claim 16 wherein the total turning is greater than 10°.

18. The apparatus of claim 16 wherein the at least one airfoil section is located within an outer half of the span of the blade.

19. The apparatus of claim 16 wherein:
an inlet angle is defined as an angle between a tangent to the meanline and a centerline of the open rotor at the leading edge;
an exit angle is defined as an angle between a tangent to the meanline and a centerline of the open rotor at the trailing edge;
the total turning is defined as an absolute value of the difference between the inlet angle in the exit angle.

20. The apparatus according to claim 16, wherein the meanline is shaped such that less than 13% of the total turning from occurs from 40% to 75% of the chord.

21. The apparatus according to claim 16, wherein a maximum camber rise of the meanline is located forward of 50% of the chord.

22. The apparatus according to claim 16, wherein a thickness of the airfoil section is defined as a distance measured normal to the meanline between the pressure side and the suction side, and wherein a maximum value of the thickness occurs at a location between about 20% to about 30% of the chord.

23. The apparatus according to claim 16, wherein the airfoil section has a maximum thickness of about 2% to about 4% of the chord.

24. The apparatus according to claim 16, wherein the airfoil section is configured to operate at a flight speed between about Mach 0.7 and about Mach 0.8.

25. The apparatus according to claim 16 wherein the second airfoil row comprises an annular array of airfoil-shaped outlet guide vanes, wherein each of the outlet guide vanes includes spaced-apart pressure and suction sides extending radially in span from a root to a tip, and extending axially in chord between spaced-apart leading and trailing edges.

26. The apparatus according to claim 16 wherein the second airfoil row comprises a second disk disposed aft of the first disk, the second disk rotatable about the axial centerline and carrying a row of airfoil-shaped blades, wherein each of the blades of the second airfoil row includes spaced-apart pressure and suction sides extending radially in span from a root to a tip, and extending axially in chord between spaced-apart leading and trailing edges, and wherein the blades of the second airfoil row are configured for rotation opposite to those of the first airfoil row.

* * * * *